United States Patent [19]

Babuder

[11] Patent Number: 5,163,721

[45] Date of Patent: Nov. 17, 1992

[54] FLUID COUPLING WITH GASKET RETAINER HAVING INTERLOCKING PORTIONS

[75] Inventor: Gerald A. Babuder, Mentor, Ohio

[73] Assignee: Cajon Company, Macedonia, Ohio

[21] Appl. No.: 602,752

[22] Filed: Oct. 24, 1990

[51] Int. Cl.⁵ .............................................. F16L 19/00
[52] U.S. Cl. .................................... 285/328; 285/379;
  285/910; 285/917; 285/330; 277/189
[58] Field of Search ............... 285/379, 328, 330, 910,
  285/917, 353; 277/136, 137, 189, 207 A;
  411/533, 542, 544, 969, 370, 915

[56] References Cited

U.S. PATENT DOCUMENTS

| | | | |
|---|---|---|---|
| 748,546 | 4/1903 | Vail | 285/353 X |
| 954,549 | 4/1910 | Turner . | |
| 1,027,565 | 5/1912 | Ramage . | |
| 1,133,320 | 3/1915 | Rockwood . | |
| 1,137,382 | 4/1915 | Calvert . | |
| 1,562,982 | 4/1925 | Muend | 285/330 X |
| 2,782,385 | 6/1954 | Collet | 285/379 X |
| 3,262,722 | 11/1964 | Gastineau et al. | 285/212 |
| 3,709,528 | 1/1973 | Cruse | 285/330 X |
| 4,552,389 | 11/1985 | Babuder et al. | 285/379 |
| 4,571,133 | 2/1986 | Lindow | 411/544 X |
| 4,650,227 | 3/1987 | Babuder et al. | 285/379 |
| 4,665,960 | 5/1987 | Brzezicki | 285/18 X |
| 4,685,707 | 8/1987 | Miyashita | 285/328 |
| 4,838,583 | 6/1989 | Babuder et al. | 285/354 |

Primary Examiner—Randolph A. Resse
Assistant Examiner—Timothy Aberle
Attorney, Agent, or Firm—Fay, Sharpe, Beall, Fagan, Minnich & McKee

[57] ABSTRACT

A gasket and retainer arrangement for use in a coupling of the type having first and second coupling components with opposed end faces including sealing ribs extending axially therefrom with an annular sealing gasket interposed therebetween comprises a retainer device for maintaining the gasket in a predetermined located position relative to the end face of one of the components. The retainer includes a generally sleeve-like body defining a retaining portion closely received over the one component at an area rearwardly from the associated radial end face. A plurality of axially extending leg portions are spaced about the retaining portion and extend axially beyond the associated end face. The annular sealing gasket has an outer periphery of a diameter at least slightly greater than the inner diameter of the sleeve-like body with recesses formed in the outer periphery to receive the axially extending leg portions whereby the gasket is maintained in aligned relationship with the end face.

15 Claims, 3 Drawing Sheets

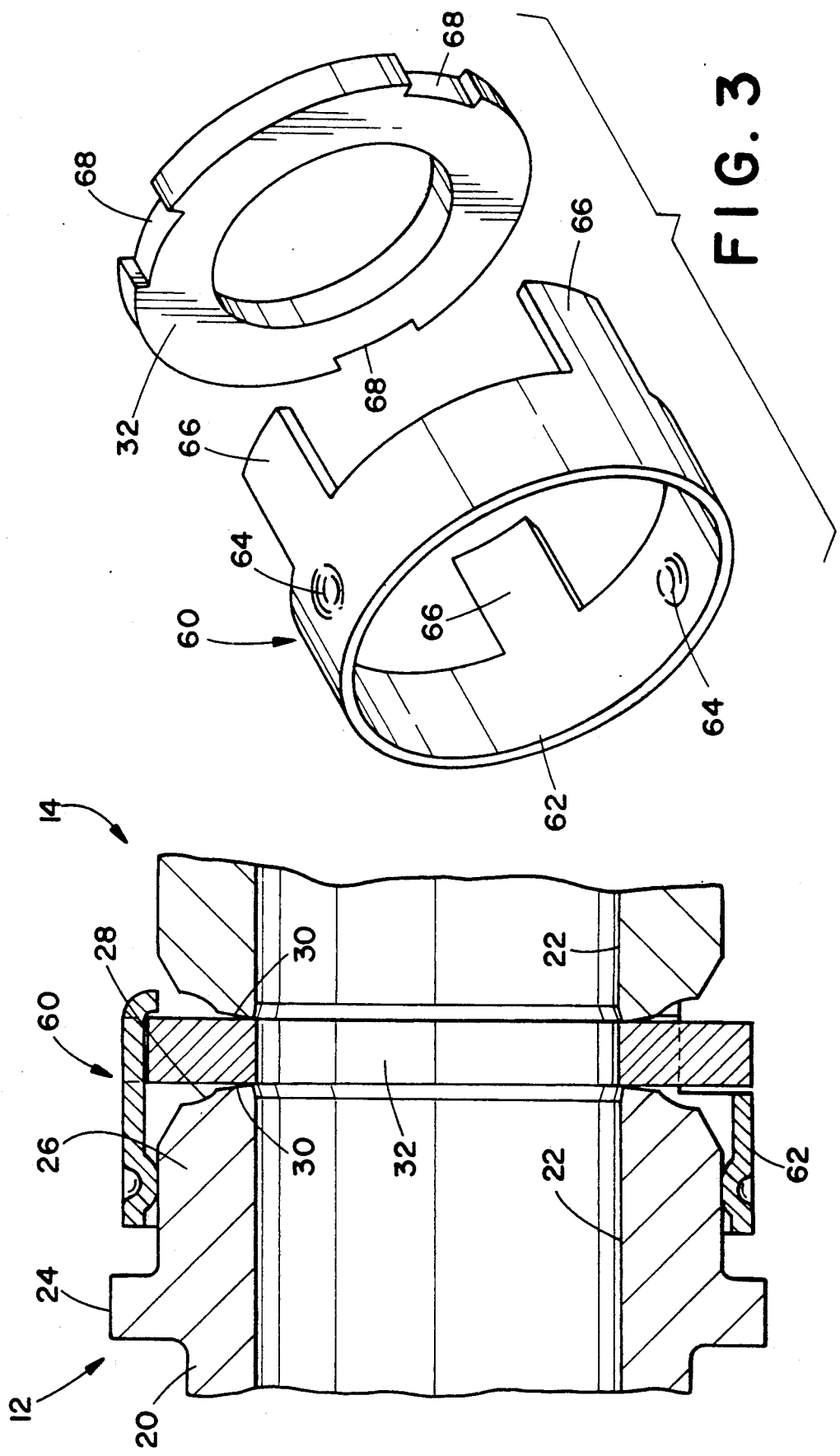

FLUID COUPLING WITH GASKET RETAINER HAVING INTERLOCKING PORTIONS

BACKGROUND OF THE INVENTION

The subject invention is directed toward the fluid coupling art and, more particularly, to an improved tube coupling particularly suited for use in high vacuum and pressure systems.

One type of coupling which has achieved widespread acceptance comprises a pair of coupling components having longitudinally extending fluid passageways and terminating in mating end faces each constituting a sealing face with an annular rib or sealing bead which extends outwardly about the associated end. With the components oriented with end faced in face-to-face relationship, an annular metal sealing gasket is interposed between the sealing beads. Suitable threaded nuts act to drive the coupling components together to cause the annular ribs to sealingly engage the gasket.

In order to properly locate the sealing gasket relative to the end faces, various gasket retainers have been proposed in the prior art. These retainers are shown, for example, in U.S. Pat. Nos. 4,552,389; 4,650,227; and, 4,838,583. The gasket retainers have been very satisfactory for their intended purpose. Recently, however, a modified form of the basic coupling design has presented difficulties with respect to the prior gasket retainers.

To understand the above, reference should be had to the commonly assigned co-pending application, Ser. No. 468,691, now U.S. Pat. No. 5,066,051, filed Jan. 23, 1990, and titled "Anti-Twist Coupling Assembly" which is incorporated herein by reference. In this new coupling design, a separate anti-torque member is mounted inside the nut members in surrounding relationship with the ends of the sealing face. This anti-torque member acts to prevent transmission of torque to the coupling components, the sealing washer, or the associated piping during tightening of the nut members.

The presence of the anti-torque member can have the effect of increasing the overall external dimensions of the coupling. In an effort at keeping these external dimensions small, the spacings between the components is reduced as much as possible. As a consequence, it is somewhat difficult to use the more conventional gasket retaining devices. Further, with the conventional gasket retainer, it is necessary for the gasket to have a smaller outer diameter than the gasket required when a retainer is not used. Thus, two different gaskets must be stocked.

SUMMARY OF THE INVENTION

The subject invention provide a gasket and retainer assembly which overcomes the noted problems and provides a gasket retainer which takes up only a small amount of space in the coupling assembly. Moreover, the gasket and retainer assembly is such that the same gasket design is capable of use either with or without an associated retainer. Thus, only one gasket needs to be inventoried to satisfy both retainer and non-retainer situations.

In particular, the subject invention comprises an improvement to a fluid coupling of the type having first and second generally cylindrical coupling components including fluid passageways extending longitudinally therethrough. The components have opposed radial inface with sealing ribs extending axially therefrom towards each other with an annular sealing gasket interposed therebetween. The coupling further includes nut members for moving the components into a closely spaced substantially coaxial relationship such that the sealing ribs sealingly engage opposite face areas of the gasket. The improvement comprises the provision of a retainer device for maintaining the gasket in a predetermined located position relative to the end face of one of the components in a substantially coaxial relationship therewith. The retainer includes a generally sleeve-like body which defines a retained portion closely received over the one component at an area spaced axially rearward from the associated radial end face. According to the invention, the retainer includes a plurality of axially extending leg portions circumferentially spaced about the retaining portion and extending axially outward beyond the associated radial end face. The sealing gasket has an outer periphery of a diameter at least slightly greater than the inner diameter of the sleeve-like body with recesses formed in the outer periphery. The recesses are located and sized to closely receive the axially extending leg portions to thus hold the gasket in aligned relationship with the end face.

Because of the relationship between the gasket and the gasket retainer, the outer diameter of the gasket can be sized to closely correspond to the inner diameter of the nut members so that centering of the gasket and the nut member can be achieved even when a gasket retainer is not used.

In accordance with another more limited aspect of the invention, the gasket retainer and the gasket are maintained in a unitary, assembled position by having the ends of the leg provided with a catch means for preventing the gasket from being axially removed therefrom. This permits the gasket and the retainer to be handled as a single unit during installation and removal.

Preferably, the retainer also includes detents for frictionally engaging the associated coupling component so that the gasket and retainer are frictionally retained thereon. It is also contemplated that, if desired, catch means can comprise inwardly bent tab portions at the free ends of the legs.

In the preferred embodiment, the retainer is formed from a relatively thin metal having a relatively high degree of resiliency. The frictional detents can thus resiliently engage the coupling body as a result of elastic deformation of the sleeve-like body of the retainer. No special spring latches or similar connecting structure is required.

As can be seen from the foregoing, the primary object of the present invention is the provision of a tube coupling of the general type described wherein the gasket and gasket retainer assembly is a highly simplified structure which can be fitted within an extremely small space within the coupling assembly.

A further object is the provision of a gasket retainer assembly of the type described wherein the gasket itself can be used either with or without a retainer thereby limiting the need for gaskets of different sizes as would have been required with the prior gasket retainer assemblies.

Yet another, and more limited object of the invention, is the provision of a gasket retainer assembly wherein the gasket retainer engages radially inward of the maximum outer periphery of the gasket.

BRIEF DESCRIPTION OF THE DRAWINGS

The above and other objects and advantages will become apparent from the following description when read in conjunction with the accompanying drawings wherein:

FIG. 2 is a greater enlarged view of the circled area of FIG. 1;

FIG. 3 is a pictorial view of the gasket and gasket retainer elements; and

DETAILED DESCRIPTION OF THE PREFERRED EMBODIMENT

Figure 1:
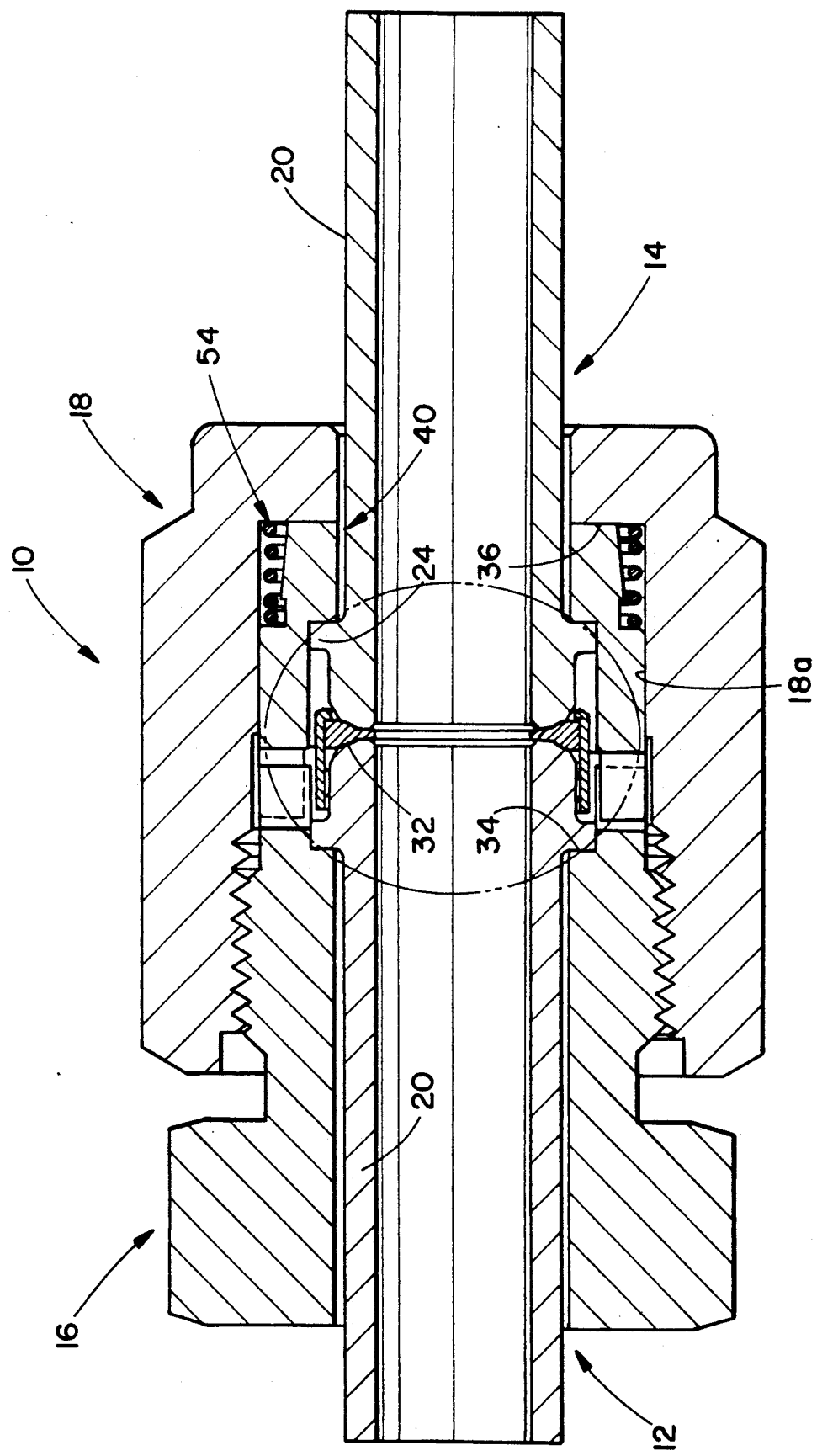
FIG. 1 is a longitudinal cross-sectional view taken through a coupling assembly formed in accordance with a preferred embodiment of the subject invention.
Figure 4:
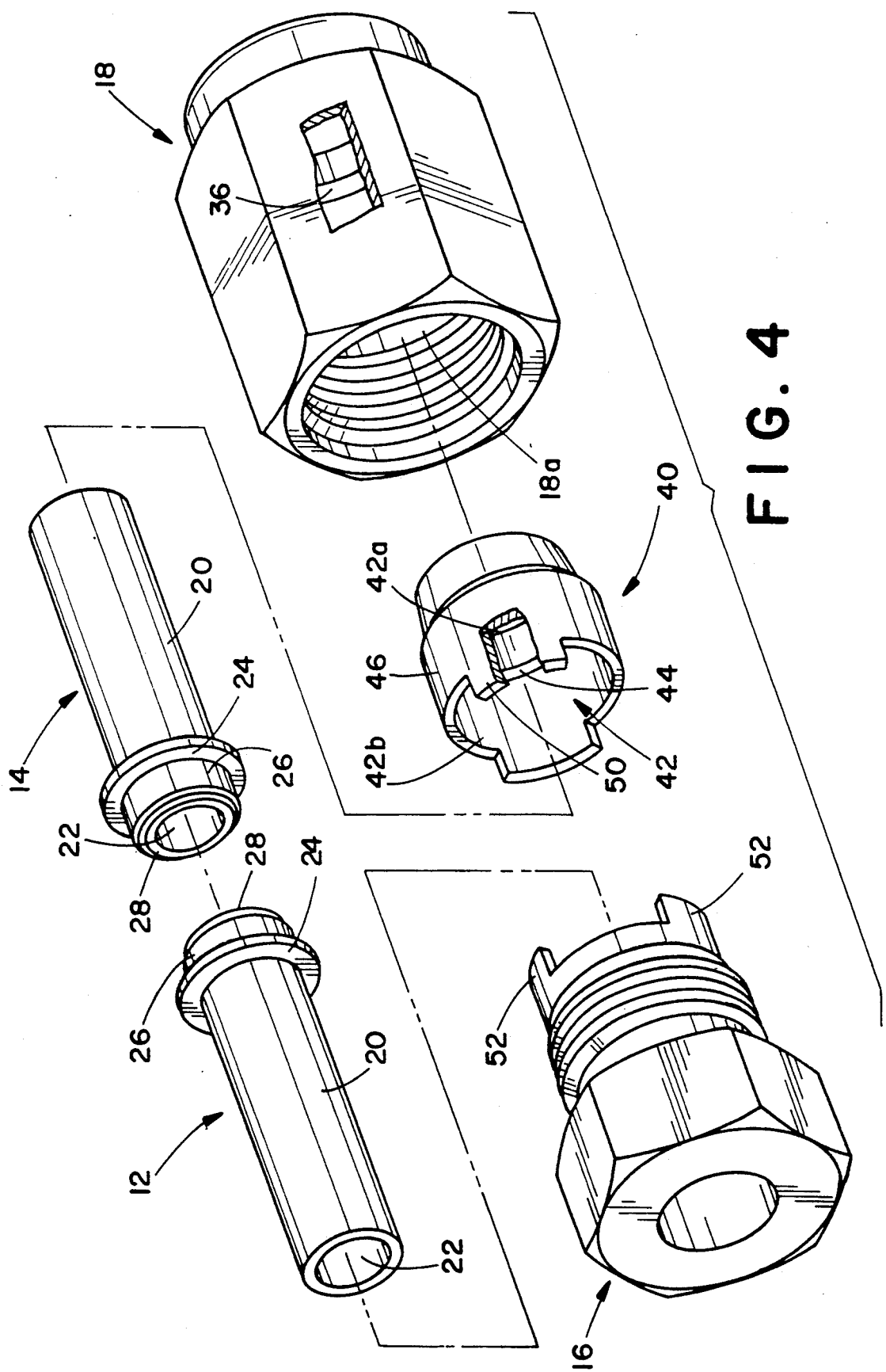
FIG. 4 is an exploded pictorial view of all elements of the coupling except for the gasket and gasket retainer.

Referring more particularly to the drawings wherein the showings are for the purpose of illustrating a preferred embodiment of the invention only, and not for the purpose of limiting same, FIGS. 1 and 4 best show the overall arrangement of a tube coupling assembly formed in accordance with the present invention and generally comprising first and second coupling components 12 and 14 which are held in aligned and connected position by suitable threaded nut members 16 and 18.

In the subject embodiment, the coupling components 12 and 14 are substantially identical and are formed as separate elements independent of the nut members 16 and 18. They could, under certain circumstances, be combined with the nut members or formed as integral portions of related structures such as valves, manifolds, or the like. As illustrated, each of the coupling members 12, 14 comprise a generally cylindrical main body 20 with a through-flow passage 22 extending axially therethrough. A radially extending flange 24 is formed adjacent an enlarged end 26 which has a sealing end face 28. Referring to FIG. 2, it will be noted that each of the end faces 28 includes a circumferentially extending bead or rib 30. The bead or rib 30 acts as a sealing surface for engagement with a metal gasket member 32. The particular preferred details of the rib 30 form no part of the present invention but are described more fully in my commonly assigned co-pending application filed Jul. 9, 1990 for "Improved Tube Coupling".

As was mentioned, the threaded nut members 16, 18 maintain the coupling components 12 and 14 in aligned face-to-face relationship on opposite sides of the gasket 32. This relationship is best shown in FIG. 1.

By tightening the threaded nut member 16, 18, axial forces are applied to the coupling components 12, 14 to cause their sealing ribs 30 to engage into the opposite faces of the annual metal gasket member 32. In this regard, the nut member 16 includes a counterbored section 34 which is sized to closely receive the flange 24 to align the coupling component 12 and to apply the necessary axially directed forces. Similarly, positioned between a radially extending shoulder 36 on nut member 18 and the flange 24 of coupling component 14 is a sleeve-like, generally cylindrical anti-torque member 40. The anti-torque member is described more fully in the previously mentioned, commonly assigned, co-pending application entitled "Anti-Twist Coupling Assembly". In general, however, the anti-torque member 40 is best illustrated in FIG. 4 and is arranged to prevent torque from being applied from the nut members to the coupling components 12, 14 to eliminate the possibility of producing rotation of these coupling components relative to each other, the associated system pipe, or the gasket 32. Broadly, the member 40 includes a stepped diameter axially extending opening 42 which includes a first section 42a which is sized so as to freely receive the cylindrical portion 20 of the coupling component 14. This relationship is illustrated in FIG. 1. The second section 42b of the opening 42 is sized so as to closely receive the flange 24 of coupling component 14. The shoulder face 44 between the cylindrical sections 42a and 44b is arranged to engage the flange 24 of coupling component 14 in the manner shown to apply axial forces thereto. The exterior cylindrical section 46 of anti-torque member 40 is sized so as to be freely and closely received within the cylindrical interior 18a of nut member 18.

As best seen in FIG. 4, the anti-torque member 40 further includes a pair of diametrically opposed, axially extending fingers or tabs 50. A corresponding pair of similar tabs 52 extend from the inner end of the nut member 16. These tabs 50, 52 inter-engage as illustrated in FIG. 1. Consequently, during the tightening of the nut members 16, 18, forces capable of producing relative rotation cannot be applied to the coupling members 12, 14. That is, the inter-engagement of the tabs 50, 52 assures that the nut member 16 and the anti-torque member 4 are located together in a manner which does not allow torque to be transmitted to the coupling components 12, 14.

As described more fully in the aforementioned co-pending application, a coil spring member 54 is preferably provided about the reduced diameter right-hand end of the anti-torque member 40. This compression spring 54 assists in assembly and make-up of the coupling. In particular, it maintains the anti-torque member 40 in an axially outwardly biased position relative to the nut member 18 such that the tabs 50 are clearly visible to the assembler so that they can be properly engaged with the tab members 52 as the nut members 16, 18 are threaded together at the start of the make-up operation.

As previously discussed, the presence of the anti-torque member 40 tends to increase the overall size of the coupling or to reduce the space available in the interior for use of gasket retainers if such are desired. The typical prior gasket retainers as shown, for example, in prior U.S. Pat. Nos. 4,552,389; 4,650,227; and 4,838,583 are such that when used, they require a different diameter gasket then those gaskets used when a retainer is not present. The gasket and retainer assembly of the subject invention allows the use of a gasket retainer when the anti-torque member is used. Also, retainer gasket retainer of the subject invention uses a gasket which can function adequately when a retainer is not used. That is, the outer diameter of the gasket can be the same as is required for non-retainer use. As specifically shown in FIGS. 2 and 3, the gasket and retainer assembly of the subject invention comprises a sleeve-like cylindrical retainer member 60 which has a main circumferentially continuous body section 62 which has an inner diameter that is only slightly larger than the diameter of the end section 26 of the coupling component 12. As illustrated in FIG. 2, this allows the retainer 60 to be received on the end of the coupling component 12 in surrounding relationship to the sealing face 28. Preferably, the retainer 60 is arranged to be frictionally engaged with and retained on the end portion 26 by, for example, a pair of detent or bead-like deformations 64 which are formed at diametrically opposite sides of the body portion 62 to resiliently and frictionally engage the outer surface of section 26 of the coupling component 12.

To assure proper gripping by the detent or bead-like deformations, the body of the retainer is preferably formed from a resilient metal. For example, in the subject embodiment, the retainer is formed from stainless steel with a wall thickness in the range of about 0.004 inches to about 0.008 inches. The sleeve-like body of the retainer can thus elastically deflect radially to assume a non-circular shape to produce gripping by the detents.

Extending axially from the right-hand end of body portion 62 (as viewed in FIGS. 2 and 3) are a plurality of fingers or tab-like formations 66. Corresponding grooves or slots 68 are formed about the periphery of the gasket 32. The width and location of the recesses 68 are such as to exactly correspond to the width and location of the fingers 66. Additionally, the major diameter of the gasket member 32 is preferably substantially equal to the outer diameter of the body section 62 of the gasket retainer 60. Thus, when the gasket 32 is positioned in the assembled relationship on the fingers 66, the outer end portions of the tabs can be deflected radially inward to thus hold the gasket in position on the retainer 60. Thus, the gasket and the retainer are a unitary assembly which facilitate installation and mounting of the gasket in position on the coupling components 12 or 14. In addition, the relationship between the gasket and retainer remains constant irrespective of removal or replacement of the assembly.

The invention has been described with reference to the preferred and alternative embodiments. Obviously, modifications and alterations will occur to others upon a reading and understanding of this application. It is intended to include all such modifications and alterations in so far as they come within the scope of the appended claims or the equivalents thereof.

Having thus described the invention, it is now claimed:

1. In a fluid coupling of the type having first and second generally cylindrical coupling components including fluid passageways extending longitudinally thereof, said components having opposed radial end faces including sealing ribs extending axially therefrom toward each other with an annular sealing gasket interposed therebetween, said coupling further including nut means for moving said components into a closely-spaced substantially coaxial relationship such that said sealing ribs sealingly engage opposite face areas of said gasket, the improvement comprising:
a retainer device for maintaining said gasket in a predetermined located position relative to the end face of one of said components in a substantially coaxial relationship therewith, said retainer including a generally sleeve-like body defining a retaining portion closely received over said one component at an area thereof spaced axially rearward from the associated radial end face, said retainer further including a plurality of axially extending leg portions circumferentially spaced about said retaining portion and extending axially outwardly beyond said associated radial end face, said annular sealing gasket having an outer periphery of a diameter at least slightly greater than the inner diameter of said sleeve-like body with recesses formed in said outer periphery, said recesses receiving said axially extending leg portions whereby said gasket is maintained in aligned relationship with said end face; and,
catch means on said leg portions to prevent axial removal of said gasket from said retaining portion.

2. The improvements as defined in claim 1 wherein said gasket has a maximum outer diameter which is substantially equal to the maximum outer diameter of said sleeve-like body.

3. The improvement as defined in claim 1 wherein said catch means comprises radially inward extending tabs formed on the ends of at least some of said leg portions.

4. The improvement as defined in claim 1 wherein said legs are aligned with said sleeve-like body.

5. The improvement as defined in claim 4 wherein said legs are an extension of said sleeve-like body and are integral therewith.

6. The improvement as defined in claim 1 wherein said legs are located at uniformly spaced locations about said sleeve-like body.

7. The improvement as defined in claim 1 wherein said legs are each of uniform width and wherein said recesses are sized to closely receive said legs.

8. The improvement as defined in claim 1 wherein said recesses are grooves which open radially outward.

9. The improvement as defined in claim 8 wherein there are at least three of said recesses.

10. In a fluid coupling of the type having first and second generally cylindrical coupling components including fluid passageways extending longitudinally thereof, said components having opposed radial end faces including sealing beads extending axially therefrom toward each other with an annular sealing gasket interposed therebetween, said coupling further including means for moving said components into a closely-spaced substantially coaxial relationship such that sealing beads sealingly engage opposite face areas of said gasket, the improvement comprising:
a retainer device for maintaining said gasket in a predetermined located position relative to the end face of one of said components in a substantially coaxial relationship therewith, said retaining portion of sleeve-like configuration closely received over said one component at an area thereof spaced axially rearward from the associated radial end face, said retainer further including a plurality of axially extending leg portions circumferentially spaced about said cylindrical body and extending axially outward about said associated radial end face, said annular sealing gasket having a maximum outer diameter which is substantially as great as the maximum outer diameter of said retaining portion and an outer periphery with recesses formed therein and receiving said axially extending leg portions to maintain said gasket in aligned relationship with said end face; and,
catch means on said leg portions for preventing axial removal of said sealing gasket from said leg portions.

11. The improvement as defined in claim 10 wherein said catch means comprises tabs formed on the ends of at least some of said leg portions.

12. The improvement as defined in claim 10 wherein said legs are located at uniformly spaced locations about said sleeve-like body.

13. In a fluid coupling of the type having first and second generally cylindrical coupling components including fluid passageways extending longitudinally thereof, said components having opposed radial end faces including sealing ribs extending axially therefrom toward each other with an annular sealing gasket interposed therebetween, said coupling further including nut means for moving said components into a closely-spaced substantially coaxial relationship such that said sealing ribs sealingly engage opposite face areas of said gasket, the improvement comprising:

a retainer device for maintaining said gasket in a predetermined located position relative to the end face of one of said components in a substantially coaxial relationship therewith, said retainer including a generally sleeve-like body defining a retaining portion closely received over said one component at an area thereof spaced axially rearward from the associated radial end face, said retainer further including a plurality of axially extending leg portions circumferentially spaced about said retaining portion and extending axially outwardly beyond said associated radial end face, said annular sealing gasket having an outer periphery of a diameter at least slightly greater than the inner diameter of said sleeve-like body with recesses formed in said outer periphery, said recesses receiving said axially extending leg portions whereby said gasket is maintained in aligned relationship with said end face; and, said cylindrical body being circumferentially continuous and including detents carried by said retaining portion for frictionally engaging said one component at circumferentially spaced locations.

14. In a fluid coupling of the type having first and second generally cylindrical coupling components including fluid passageways extending longitudinally thereof, said components having opposed radial end faces including sealing beads extending axially therefrom toward each other with an annular sealing gasket interposed therebetween, said coupling further including means for moving said components into a closely-spaced substantially coaxial relationship such that said sealing beads sealingly engage opposite face areas of said gasket, the improvement comprising:

a retainer device for maintaining said gasket in a predetermined located position relative to the end face of one of said components in a substantially coaxial relationship therewith, said retainer including a generally cylindrical body including a retaining portion of sleeve-like configuration closely received over said one component at an area thereof spaced axially rearward from the associated radial end face, said retainer further including a plurality of axially extending leg portions circumferentially spaced about said cylindrical body and extending axially outward about said associated radial end face, said annular sealing gasket having an outer periphery with recesses formed therein and receiving said axially extending leg portions to maintain said gasket in aligned relationship with said end face; and, said cylindrical body being circumferentially continuous and including detents carried by said retaining portion for frictionally engaging said one component at circumferentially spaced locations.

15. The improvement as defined in claim 14 wherein said cylindrical body is formed of a relatively thin and resilient metal capable of elastically deforming in the radial direction to produce frictional engagement of said detents with said one component.

* * * * *